June 22, 1926.
O. T. ROUSE
1,589,429
MACHINE FOR APPLYING AND REMOVING SANITARY COVERS FOR TOILET SEATS
Filed April 4, 1925   3 Sheets-Sheet 1
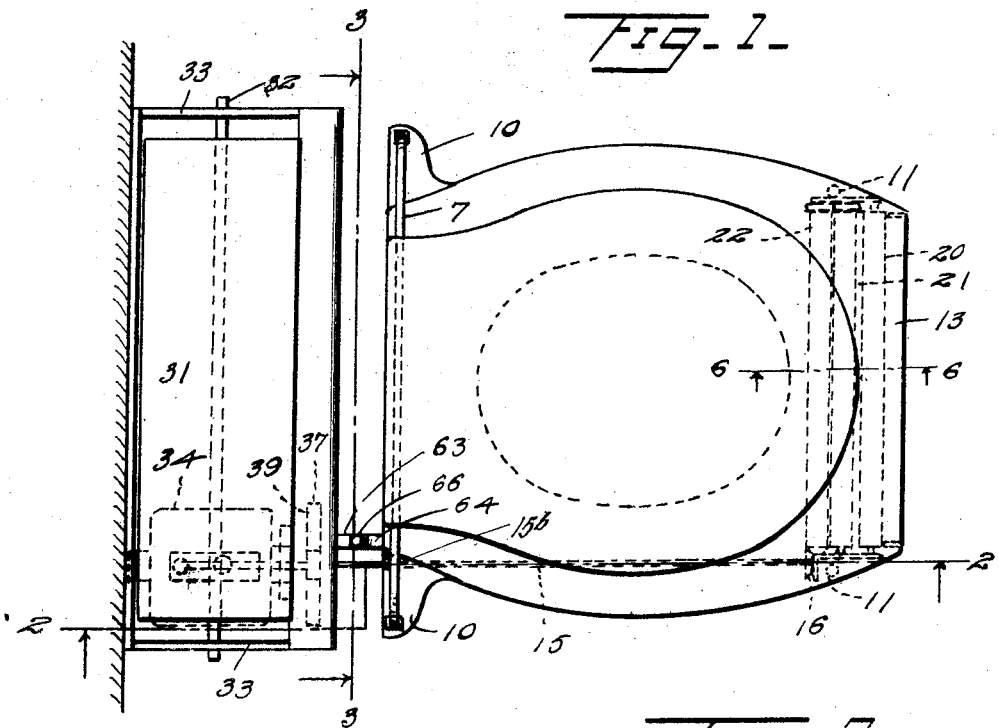
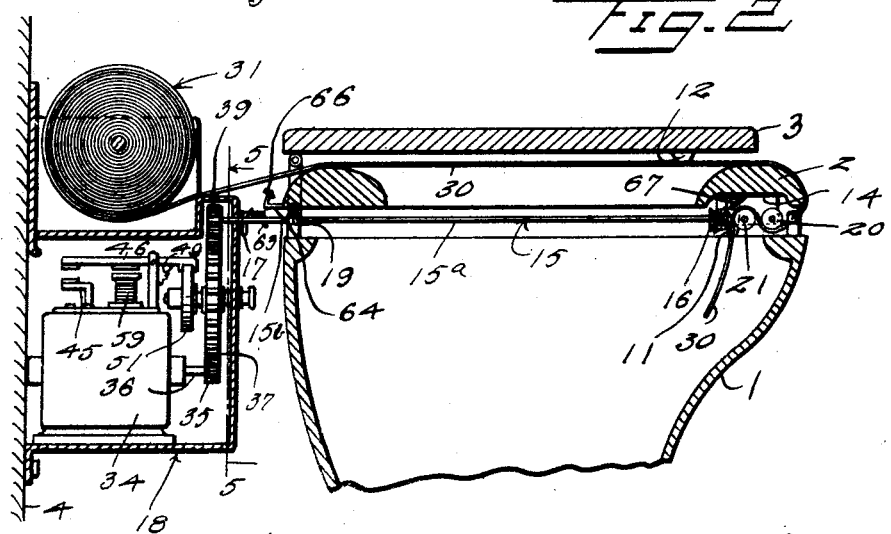
Inventor
O. T. Rouse June 22, 1926. 1,589,429
O. T. ROUSE
MACHINE FOR APPLYING AND REMOVING SANITARY COVERS FOR TOILET SEATS
Filed April 4, 1925 3 Sheets-Sheet 2
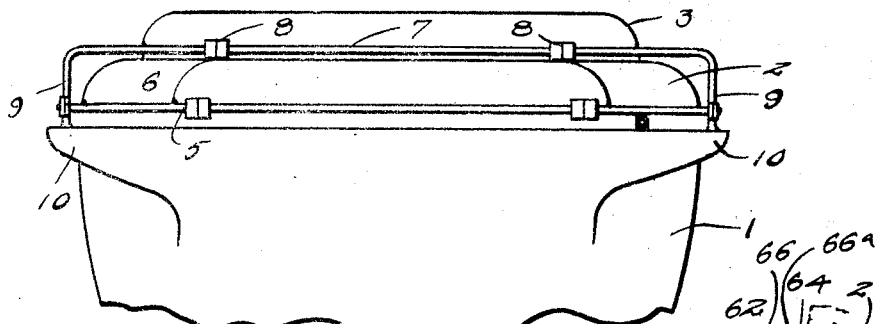
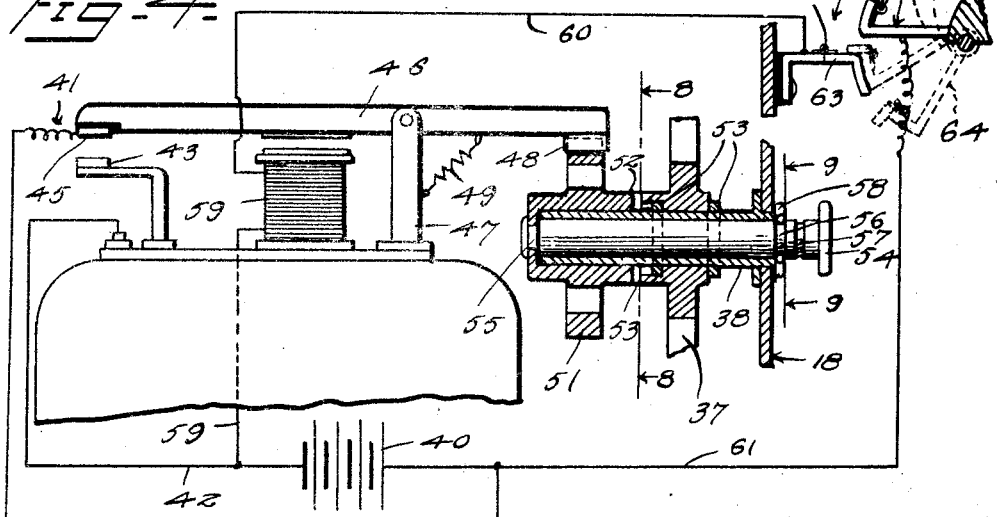
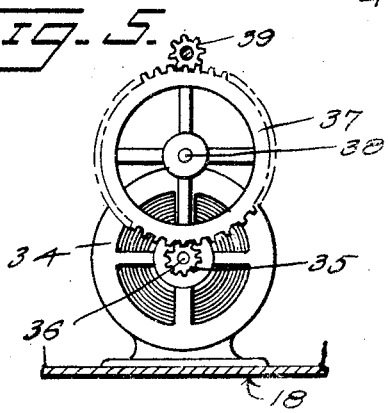
Inventor
O. T. Rouse
By
Attorney June 22, 1926.
O. T. ROUSE
1,589,429
MACHINE FOR APPLYING AND REMOVING SANITARY COVERS FOR TOILET SEATS
Filed April 4, 1925    3 Sheets-Sheet 3
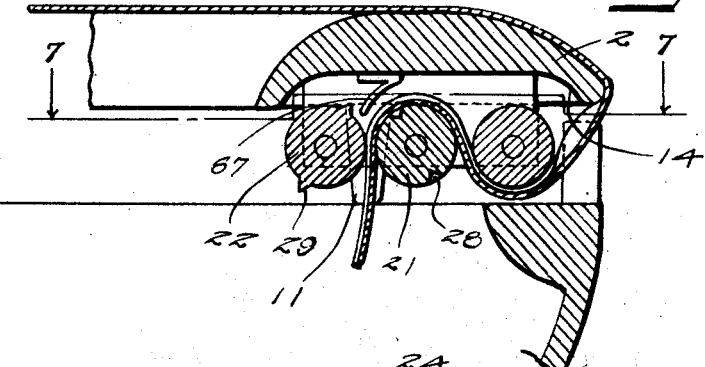
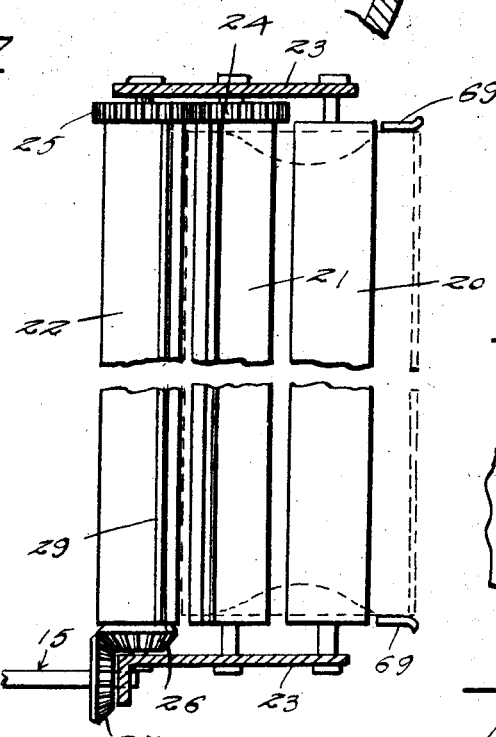
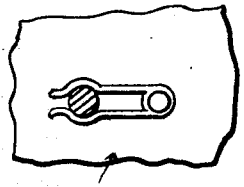
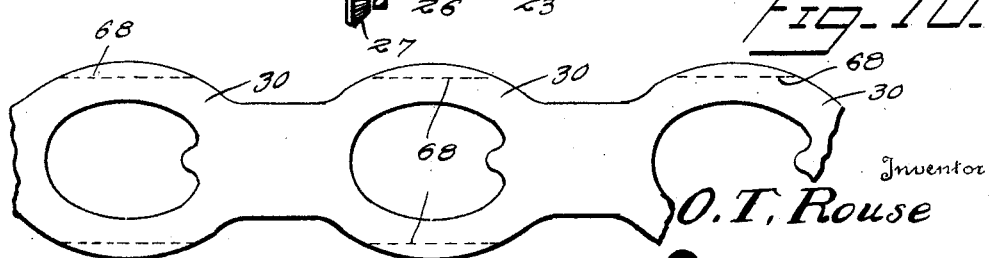
Inventor
O. T. Rouse
By
Attorney Patented June 22, 1926.

1,589,429

UNITED STATES PATENT OFFICE.

OSCAR T. ROUSE, OF CHICAGO, ILLINOIS.

MACHINE FOR APPLYING AND REMOVING SANITARY COVERS FOR TOILET SEATS.

Application filed April 4, 1925. Serial No. 20,707.

This invention relates to sanitary covers for toilet seats, and has for one of its objects the provision of a machine which shall be adapted, after each occupation of the seat, to remove the used cover and deposit it in the bowl and at the same time position a fresh cover on the seat.

A further object of the invention is the provision of a machine of the character stated which shall be adapted to cut the used cover into several pieces before depositing it in the bowl in order to prevent the clogging of the drain pipe or the outlet of the bowl.

A still further object of the invention is the provision of a machine of the character stated which may be manually actuated or which may be fully or semi-automatic in its operation.

With the above and other objects in view, the invention consists of the construction, combination and arrangement of parts hereinafter fully described and claimed, and illustrated in the accompanying drawings, wherein:

Figure 1 is a top plan view illustrating the application of the machine,

Figure 2 is a sectional view taken on the vertical plane indicated by the line 2—2 of Figure 1, Figure 3 is a sectional view taken on the vertical plane indicated by the line 3—3 of Figure 1, Figure 4 is a detail view partly in elevation and partly in vertical section of the means for controlling the electric motor of the machine, Figure 5 is a detail sectional view taken on the vertical plane indicated by the line 5—5 of Figure 2, Figure 6 is a detail sectional view on an enlarged scale taken on the plane indicated by the line 6—6 of Figure 1, Figure 7 is a detail sectional view taken on the horizontal planes indicated by the line 7—7 of Figure 6, Figure 8 is a detail sectional view taken on the vertical plane indicated by the line 8—8 of Figure 4, Figure 9 is a detail sectional view taken on the vertical plane indicated by the line 9—9 of Figure 4, Figure 10 is a plan view of a fragmentary portion of the strip of the toilet seat covers, and Figure 11 is a detail view in side elevation of a universal joint by which the feed roller driving shaft sections are connected.

Corresponding and like parts are referred to in the following description, and designated in the several views of the accompanying drawings, by similar reference characters.

In the drawings 1 designates the bowl, 2 the seat and 3 the cover of a toilet receptacle, and 4 the wall adjacent which the receptacle is situated. The seat 2 is connected to a horizontal rod by spring hinges 6 and the cover 3 to a horizontal rod by hinges 8. The rod 5 is supported above the upper edge of the bowl 1 and the rod 7 above the rod 5 by means of brackets 9 which are secured to lugs or ears 10 projecting laterally from the upper rear edge of the bowl 1. The front end of the seat 2 is supported by cushions 11 which contact with the upper edge of the bowl 1, and the front end of the cover 3 is supported by cushions 12 which contact with the upper side of the seat 2. The seat 2 is provided with a straight front edge 13, and in the under side thereof is formed a transversely extending recess 14.

A shaft 15 is journaled beneath the seat 2 in a bearing 16 secured to the under side of the front portion of the seat and in a bearing opening 17 formed in the front wall of a casing 18 which is positioned in rear of the bowl 1 and secured to the wall 4. The shaft 15 is of sectional formation and the contiguous ends of the sections thereof are connected by a universal joint 19 which permits that section 15$^a$ thereof that underlies the seat 2 to swing upwardly and downwardly with respect to that section 15$^b$ that extends rearwardly beyond the bowl 1 as the seat 2 is raised and lowered. The universal joint 19 may be of the construction shown in Figure 11 or of any other suitable construction. Rollers 20, 21 and 22 are situated below and extend transversely of the front portion of the seat 2 in alinement with the recess 14. These rollers are journaled in bracket plates 23 that are secured to and depend from the top wall of the recess 14. The member 20 is a guide or direction roller and the members 21 and 22 are feeding and cutting rollers. The rollers 21 and 22 are provided respectively with intermeshing gears 24 and 25, and the roller 22 is provided with a beveled gear 26 which meshes with a beveled gear 27 secured to the shaft 15. Grooves 28 are formed in the periphery of the roller 21 and extend longitudinally thereof, and are provided for the reception of knife blades 29 projecting from the periphery of the roller 22 and extending longitudinally thereof.

The sanitary covers 30 for the seat 2, which are preferably of the construction shown in Figure 10 are connected end to end and rolled. The roll 31 of the covers 30 is mounted on a shaft 32 journaled in bracket plates 33 extending upwardly from the top wall of the casing 18. One of the covers 30 overlies and contacts with the upper side of the seat 2, and a portion of the cover in advance of the one overlying the seat passes beneath the guide roller 20, over the feeding or pulling roller 21 and downwardly between this roller and the feeding or pulling roller 22, as clearly illustrated in Figures 2 and 6. As a portion of the cover passes downwardly between the rollers 21 and 22, these rollers will when rotated through the medium of the shaft 15 draw the strip of covers 30 forwardly to deposit the used cover in the bowl 1 and to position a fresh cover upon the seat 2. As the used cover passes between the rollers 21 and 22 it is cut into several pieces by the knife blades 29, and due thereto it will not stop up the waste pipe or the outlet of the bowl 1.

The shaft 15 may be manually operated if desired, and to permit of this operation thereof a hand crank, not shown may be connected to its section 15$^b$. In most instances it is desired to operate the shaft 15 by an electric motor 34 located within the casing 18. A pinion 35 is fixed to the armature shaft 36 of the motor 34 and meshes with a gear wheel 37 mounted upon a counter-shaft 38. A pinion 39 fixed to the shaft 15 meshes with the gear wheel 37. The motor 34 is, as shown in Figure 4, included in a circuit which comprises a suitable source of electrical energy 40 and a switch 41. A lead 42 extends from the source of energy 40 to one of the brushes of the motor 34, and the stationary member 43 of the switch 41 is connected to the other brush of the motor. A lead 44 extends from the source of electrical energy 40 to the movable member 45 of the switch 41. This member is secured to and insulated from a lever 46 which is pivoted intermediate its ends to a bracket 47. The switch member 45 is secured to one end of the lever 46, and the lever is provided at its other end with a detent 48. A spring 49 secured to the lever 46 and bracket 47 functions to normally hold the switch members 43 and 45 out of contact with each other and the detent 48 in a notch 50 in the periphery of a wheel 51 which is mounted on the shaft 38 and which is provided with a clutch face 52 for engagement with a clutch base 53 on the gear wheel 37. The shaft 38 is stationary, and the gear wheel 37 is held against movement in the direction of the length thereof by collars 53. The wheel 51 is slidably as well as rotatably mounted upon the shaft 38, and is adapted to be moved into and out of clutching engagement with the gear wheel 37 by a rod 54 which is slidably mounted on the shaft 38 and which is swivelly connected as at 55 to the wheel 51. The rod 54 is provided with a pair of relatively spaced grooves 56 and 57, and a spring clip secured to the front wall of the casing 18 is adapted to engage in one or the other of these grooves. When the clip 58 is in engagement with the groove 57 the wheel 51 is held out of meshing engagement with the gear wheel 37, while when it is in engagement with the groove 56 the wheel 51 is held in clutching engagement with the gear wheel 37. An electro-magnet 59 is adapted when energized to rock the lever 46 against the tension of the spring 49 with the result that the switch member 45 will be moved into contact with the switch member 43 and the detent 48 moved out of the notch 50 in the wheel 51. The circuit of the motor 34 is now closed, and as a result the pinion 35, gear wheel 37, wheel 51, pinion 39, shaft 15 and rollers 21 and 22 will be rotated, and during the rotation of these parts the detent 50 will contact with the periphery of the wheel 51. The electromagnet 59 remains energized until the wheel 51 has rotated far enough to carry the notch beyond the detent 48, and thereafter the lever 46 is held in switch closing position by the wheel 51 and the detent 48 until the notch 50 again registers with the detent 48. Promptly upon the registration of the detent 48 and notch 50, spring 49 will react and move the lever 46 in the direction to separate the switch members 43 and 45 and move the detent 48 into the notch 50, with the result that the circuit of the motor 34 will be broken and all parts of the machine brought to a stop. The motor 34 operates for a period of time sufficient to enable the rollers 21 and 22 to remove the used cover 30 from the seat 2, cut such cover into several parts and deposit it in the bowl 1, and move a fresh cover over the seat. The electromagnet 59 is included in a circuit which comprises leads 59, 60 and 61, the source of electrical energy 40, and a switch 62. The switch 62 comprises a stationary member 63 which is secured to and insulated from the front wall of the casing 18, and a movable member 64 secured to the seat 2. After each occupation thereof, the seat 2 is swung upwardly by the spring hinges 6, and during the first phase of the upward movement thereof the switch member 64 contacts with the switch member 63. During the second phase of the upward movement of the seat 2 the switch member 64 is out of contact with the switch member 63. While the switch member 64 is in contact with the switch member 63, the circuit of the electro-magnet 59 is closed, and these switch members remain in contact and thereby maintain the circuit of the electromagnet 59 closed until the wheel 51 has been moved far enough to carry its notch 50 beyond the detent 48. If desired, a switch of the push button type may be used in the circuit of the switch 62. When the switch 62 is used the machine is fully automatic in its operation, while when the push button type of switch is used the machine is semi-automatic in operation. In order to prevent the closing of the circuit to the electro-magnet 59 when the seat 2 is lowered, the switch member 63 is hinged as at 65 for upward movement by a lug 66 made of insulation and secured to the switch member 64.

To direct the covers between the rollers 21 and 22, a guide 67 is secured in the recess 14 above these rollers and in order to prevent the edges of the covers from contacting with the gears 24 and 25 said edges are folded inwardly along the dotted lines 68 before reaching the roller 21 by guides 69. The wheel 51 is mounted for movement out of clutching engagement with gear wheel 37 to permit the initial application of the covers and to permit the adjustment of the covers when occasion requires.

From the foregoing description, taken in connection with the accompanying drawings, the advantages of the construction and of the method of operation of the machine will be readily apparent to those skilled in the art to which it appertains. While I have described the principle of operation of the machine, together with the structure which I now consider to be the best embodiment thereof, I desire to have it understood that the structure shown is merely illustrative, and that such changes may be made when desired as are within the scope of the invention as claimed.

What I claim as my invention is:—

1. A rolled strip of sanitary covers for the seat of a toilet one of which rests upon the seat, a pair of feed rollers journaled below the seat and between which a portion of the strip is located, an electric motor, means establishing a driving connection between the rollers and the motor, a switch for the motor, and means adapted to hold the switch closed for a predetermined length of time.

2. A rolled strip of sanitary covers for the seat of a toilet one of which rests upon the seat, a pair of feed rollers journaled below the seat and between which a portion of the strip is located, an electric motor, means establishing a driving connection between the rollers and the motor, a switch for the motor embodying a stationary and a movable member, an electro-magnet associated with the movable member, a spring normally holding the movable switch member out of contact with the stationary switch member, a notched wheel driven by said means, a detent carried by the movable switch member and entering the notch of said wheel, and a switch for the electro-magnet.

3. A rolled strip of sanitary covers for the seat of a toilet one of which rests upon the seat, a pair of feed rollers journaled below the seat and between which a portion of the strip is located, a shaft journaled below the seat for driving said rollers, an electric motor, a counter-shaft, a train of gearing associated with said shaft and the armature shaft of the motor, a switch for the motor embodying a stationary and movable member, a spring normally holding the movable member out of contact with the stationary member, an electro-magnet associated with said movable member, a wheel driven by said gearing and provided with a notch, a detent carried by the movable switch member and entering said notch, and a switch for the electro-magnet.

4. A roll strip of sanitary covers for the seat of a toilet one of which rests upon the seat, a pair of feed rollers journaled below the seat and between which a portion of the strip is located, meshing gears carried by said rollers, a shaft geared to one of said rollers and comprising sections connected together by a universal joint, a pinion carried by said shaft, a stub shaft, a gear wheel journaled on the stud shaft, an electric motor, a pinion fixed to the armature shaft of the motor, a wheel slidably and rotatably mounted upon the stud shaft and having clutching engagement with said gear, a rod by which said wheel may be moved into and out of clutching engagement with said gear, a switch for the motor embodying a stationary and movable member, a spring normally holding the movable member out of contact with the stationary member, a detent carried by the movable member and engaging in said notch, an electro-magnet associated with the movable member, and a switch for the electro-magnet.

5. In a machine of the character set forth, comprising means adapted to be operated to advance a web of paper over a toilet seat, an electric motor for operating said means, a switch for the motor, means for closing said switch, and motor-actuated means for holding said switch closed for a predetermined length of time.

6. In a machine of the character set forth, comprising means adapted to be operated to advance a web of paper over a toilet seat, an electric motor for operating said means, a switch for the motor, electrical means for closing said switch, and motor-actuated means for holding said switch closed for a predetermined length of time.

7. A machine of the character set forth comprising, in combination with a resiliently supported toilet bowl seat, means adapted to be operated to advance a web of paper over the seat, an electric motor for operating said means, a switch for the motor, electrical means under the control of the seat for closing the switch, and motor-actuated means for holding said switch closed for a predetermined length of time.

8. A machine of the character set forth comprising, in combination with a resiliently supported toilet bowl seat, means adapted to be operated to advance a web of paper over the seat, an electric motor for operating said means, a switch for the motor, electrical means for closing said switch and under the control of the seat during a phase of its movement from depressed to elevated position, and motor-actuated means for holding said switch closed for a predetermined length of time.

9. A machine of the character set forth comprising, in combination with a resiliently supported toilet bowl seat, means adapted to be operated to advance a web of paper over the seat, an electric motor for operating said means, a switch for the motor, electrical means for closing said switch and under the control of the seat during a phase of its movement from depressed to elevated position, and means adapted to hold said switch closed for a predetermined length of time after the seat has reached its elevated position.

10. A machine of the character set forth comprising, in combination with a resiliently supported toilet bowl seat, means adapted to be operated to advance a web of paper over the seat, a normally idle motor for operating said means, motor-starting means under the control of the seat during a phase of its movement from depressed to elevated position, and means controlling said second means for a predetermined length of time after the seat has reached its elevated position.

In testimony whereof I affix my signature.

OSCAR T. ROUSE.